US007274370B2

(12) United States Patent
Paquette

(10) Patent No.: US 7,274,370 B2
(45) Date of Patent: Sep. 25, 2007

(54) COMPOSITE GRAPHICS RENDERED USING MULTIPLE FRAME BUFFERS

(75) Inventor: Michael J. Paquette, Benicia, CA (US)

(73) Assignee: Apple Inc., Cuppertino, CA (US)

( * ) Notice: Subject to any disclaimer, the term of this patent is extended or adjusted under 35 U.S.C. 154(b) by 201 days.

(21) Appl. No.: 10/742,559

(22) Filed: Dec. 18, 2003

(65) Prior Publication Data

US 2005/0168471 A1 Aug. 4, 2005

(51) Int. Cl.
*G06F 13/00* (2006.01)
*G09G 5/36* (2006.01)
*G06T 1/60* (2006.01)

(52) U.S. Cl. ........................ 345/536; 345/545; 345/530

(58) Field of Classification Search ................ 345/536, 345/530, 545, 501, 629, 619, 418
See application file for complete search history.

(56) References Cited

U.S. PATENT DOCUMENTS

| | | | | |
|---|---|---|---|---|
| 4,555,775 | A * | 11/1985 | Pike | 715/790 |
| 5,854,640 | A | 12/1998 | North et al. | |
| 6,359,631 | B2 * | 3/2002 | DeLeeuw | 345/629 |
| 6,504,547 | B1 * | 1/2003 | Mercer | 345/503 |
| 6,911,984 | B2 * | 6/2005 | Sabella et al. | 345/536 |
| 2003/0071818 | A1 * | 4/2003 | Wilt et al. | 345/537 |

OTHER PUBLICATIONS

PCT International Search Report and PCT Written Opinion of the International Searching Authority dated Apr. 25, 2005 for corresponding International Application No. PCT/US2004/032752, filed Apr. 10, 2004, 10 pages.

* cited by examiner

*Primary Examiner*—Ulka J. Chauhan
*Assistant Examiner*—Joni Hsu
(74) *Attorney, Agent, or Firm*—Fenwick & West LLP

(57) ABSTRACT

A secondary frame buffer is provided for use by classic applications designed to paint directly to a frame buffer. Classic applications paint their windows to the secondary frame buffer, not to the primary frame buffer. A compositor reads window data from the secondary frame buffer and paints it to the primary frame buffer. The compositor also reads window data written to back buffers by other applications and paints that data to the primary frame buffer. Since the compositor maintains visible region data for all windows, the windows are correctly painted to the primary frame buffer whether they are from the back-buffered windows or from classic applications. In addition, optimizations in classic applications that cause classic windows to be inappropriately painted over newer style windows no longer have this effect, since the compositor is responsible for painting legacy windows to the frame buffer, not the applications themselves.

21 Claims, 8 Drawing Sheets

COMPOSITE GRAPHICS RENDERED USING MULTIPLE FRAME BUFFERS

BACKGROUND OF THE INVENTION

1. Field of the Invention

The present invention relates generally to rendering graphics in a computer environment. More specifically, the present invention is directed to using multiple frame buffers with a graphics compositor.

2. Description of the Related Art

Window systems that support overlapping windows and window placement must maintain information on what portions of each window are to appear in the display frame buffer. When a window's geometry—that is, position, size, or window order (front to back order in which windows appear to be layered—is changed, the window system must determine the changes to be made in the visible area of each window, perform the operations necessary to update the window's visible area, and refresh the display frame buffer's content to reflect the changes in window visible area.

FIG. 1 illustrates a conventional method for rendering content to a digital display or analog monitor. A CPU 102 draws an object either directly to frame buffer memory 106 (referred to as a frame buffer), or by a graphics processing unit 104 where one is available. A video controller 108 reads the object from frame buffer 106, and then outputs the object directly to a digital display 110, or to a digital-to-analog converter 112 that converts the output signal for display on an analog monitor 114.

FIG. 2 illustrates a frame buffer 106 such as the one described above with respect to FIG. 1. In FIG. 2, frame buffer 106 includes two windows 204, 206. For example, window 204 might be a text editing window, while window 206 could be a pop-up window. In the illustrated case, a portion of window 204 is hidden from view (i.e. covered) by window 206. The portion of window 204 that is not covered is referred to in the art as the window's "visible region." In conventional operating systems such as Apple Computer, Inc.'s OS 9, Microsoft Corporation's Windows Me, etc., where applications write their windows directly to the frame buffer 106, the applications themselves are responsible for checking the visible region of each of their windows in order to insure that covered portions of the windows are not painted to the frame buffer. One drawback to this method, referred to hereafter as the classic method, is that application developers have to include extensive lines of code devoted to checking the visible region for each window. Another drawback—a corollary to the first—is that applications have the ability to paint over the windows of other applications when they are not supposed to.

A second conventional way of rendering windows is to use a compositor. Referring to FIG. 3, a copy of each window 304, 306 is maintained in a back buffer 308, 310. Applications draw their windows in the back buffers, and are then not responsible for redrawing their windows unless the window contents change. The compositor 312 maintains data about the visible region of each window, and correctly repaints each window in frame buffer 302 as its visible area changes. This relieves the application developer of the need to track visible area.

FIG. 4 illustrates a conventional method for using a compositor such as that described with respect to FIG. 3. An application running on CPU 402 draws windows to window buffers 406, 408. Alternatively, the applications may pass the data to GPU 404, which in turn draws them to window buffers 406, 408. Compositor 410 retrieves the windows from window buffers 406, 408 and draws them in frame buffer 412. As the visible area of a window changes, for example as window 306 is moved to the left and obscures more of window 304, the compositor simply retrieves again window 304 from window buffer 308, and repaints it to the frame buffer with the correct visible area. The application that created the window is not involved in the process. Consequently, the operation proceeds much faster, and typically looks better to the user.

In order to allow applications that rely on direct writing to a frame buffer to coexist with applications running in an operating system having a compositor, some conventional operating systems have implemented hybrid graphics subsystems that can accommodate both types of applications. Referring now to FIG. 5, there is shown an example of a frame buffer 502 that includes a classic window 504 and a compositor window 506. Classic window 504 is a window drawn by an application with direct access to the frame buffer, as described above with reference to FIG. 2 and FIG. 1. Compositor window 506 is a window drawn in the frame buffer by a compositor and created as described above with reference to FIG. 3 and FIG. 4.

FIG. 6 illustrates a conventional method for combining a compositor environment with classic environment. Applications 602 that are implemented to use the compositor ("compositor applications") write their windows to a back buffer 608. Compositor 606 in turn reads data from the back buffers 608 and in combination with its own record of visible area for each window appropriately renders the windows to frame buffer 616.

As described earlier, classic applications 604 are conventionally expected to check their visible window area, and to paint only that visible area to frame buffer 616. One way which this is typically done is through a call to the operating system such as "VisRegion", which returns the correct visible region for the calling application and specified window. In the conventional hybrid system of FIG. 6, classic applications 604 request their VisRegion, and the call is handled by the compositor 606. Since the compositor is aware of the locations of both other classic application windows 614 and compositor-friendly application windows 610, 612, the compositor returns accurate information to classic applications 604 about their visible area. Classic applications 604 then correctly paint their windows to frame buffer 616.

Although this hybrid method allows classic and compositor windows to coexist within the same operating system, there is a serious downside. While classic applications 604 are conceptually supposed to request their visible area "nicely" (for example, via a VisRegion call), application developers over the years have come to recognize shortcuts that can be taken to make their code more efficient. One common shortcut is to call "GetFrontWindow", which in one classic environment returns the ID of the window in front of all other windows. If the ID returned by GetFrontWindow is the same as the ID of the window classic application 604 wants to paint, then the entire window is painted without any need to check its visible area—since it is in front, it will not be obscured by any other windows. As those of skill in the art will appreciate, this can be cause for disaster in an implementation like the one of FIG. 6. Here, classic window 614 is the only classic window on the screen, although it is obscured by windows 610 and 612, both of which are painted by the compositor 606. Accordingly, if classic application 604 calls GetFrontWindow, it will receive back its own window ID, since it is the front-most window of all of the classic windows. If it then paints window 614 in its entirety to frame buffer 616, it will paint right over windows 610 and 612, which is not the correct result.

Accordingly, there is still a need in the art for a way of allowing classic applications and a compositor to coexist in a single operating system without one disrupting the operation of the other.

SUMMARY OF THE INVENTION

The present invention provides a secondary frame buffer for use by classic (legacy) applications. Classic applications are those that are designed to paint directly to a frame buffer, rather than to a back buffer such as that used by a compositor. According to the present invention, classic applications paint their windows only to the secondary frame buffer, also known as the classic frame buffer, and not to the primary frame buffer. Instead, a compositor reads window data from the secondary frame buffer and paints it to the primary frame buffer. In addition, the compositor reads window data from back buffers written to by newer-style applications and in turn paints that data to the primary frame buffer. Since the compositor maintains visible region data for all windows, the windows are correctly painted to the primary frame buffer whether they are from the newer style applications or from classic applications. In addition, optimizations in certain classic applications that conventionally cause classic windows to be inappropriately painted over newer style windows no longer have this deleterious effect, since it is the compositor that is responsible for painting legacy windows to the frame buffer, and not the applications themselves.

Drawing is preferably performed in one of two ways. For classic windows, whose content is drawn directly to the secondary frame buffer and not to a back buffer, the application redraws the content of the window visible area in response to a repaint message, or as needed to reflect the correct window content.

Windows to be drawn via a back buffer and the compositor have their content refreshed by the application from time to time as needed to reflect the correct window content. The complete content of the window is maintained within the back buffer. The compositor may read from this buffer to draw areas revealed by window geometry changes independently of any application action.

The compositor collects the areas of all windows overlapping the region of the display frame buffer to be redrawn, in response to either a window geometry change or an explicit flush request from an application which has redrawn some portion of its back buffer. The compositor then proceeds to examine each window from the front-most window to the back, collecting content from the window back buffers to be assembled into the region to be redrawn. At each window, the compositor evaluates the collected content to determine if it has accumulated all possible content for the region to be redrawn, and stops once the entire region has been filled with opaque pixel values. The compositor may accumulate non-opaque pixel values, as well as opaque values. These values are accumulated at each pixel using a mathematical operation such as the Porter-Duff SOVER compositing equation, well known within the art.

In the present invention, the compositor no longer ignores classic windows. Instead, as it encounters classic windows while traversing the window list, it determines the area of the classic frame buffer containing the portion of the classic window content that is visible on the primary frame buffer, and collects the content from the classic frame buffer to be assembled into the region to be redrawn. The classic frame buffer is treated as a common back buffer to be shared among all classic windows.

DETAILED DESCRIPTION OF THE PREFERRED EMBODIMENTS

The figures depict preferred embodiments of the present invention for purposes of illustration only. One skilled in the art will readily recognize from the following discussion that alternative embodiments of the structures and methods illustrated herein may be employed without departing from the principles of the invention described herein.

Figure 1:
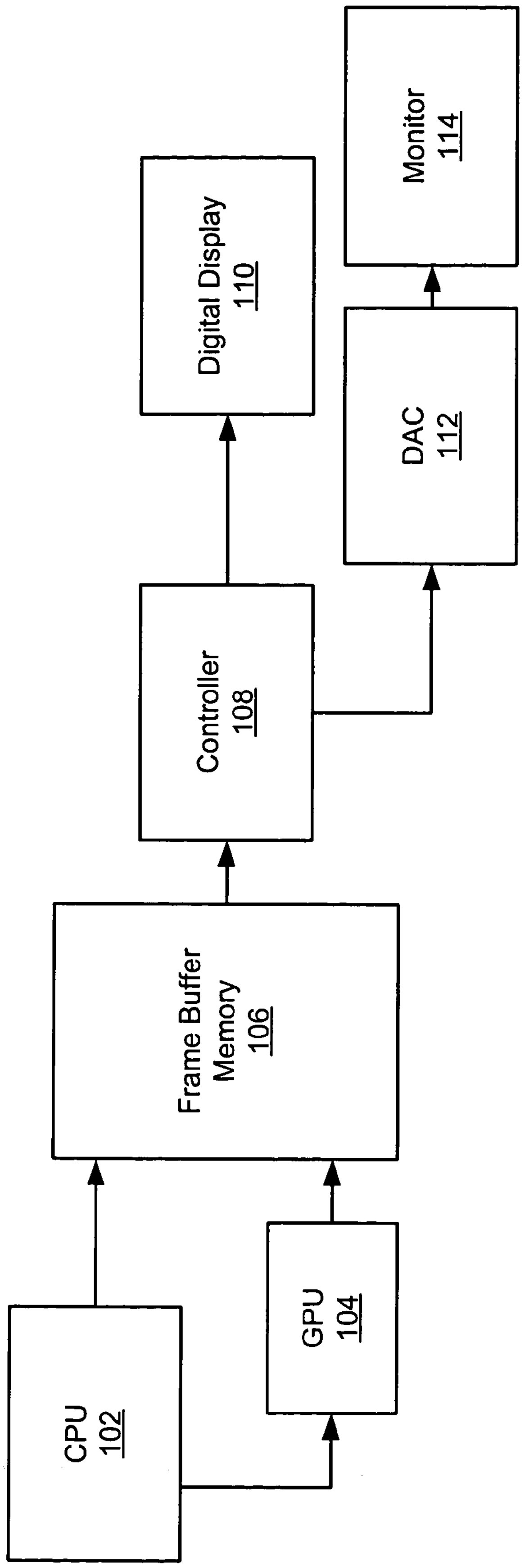
Fig. 1 (Prior Art)
FIG. 1 illustrates a conventional method for rendering content to a digital display or analog monitor.
Figure 2:
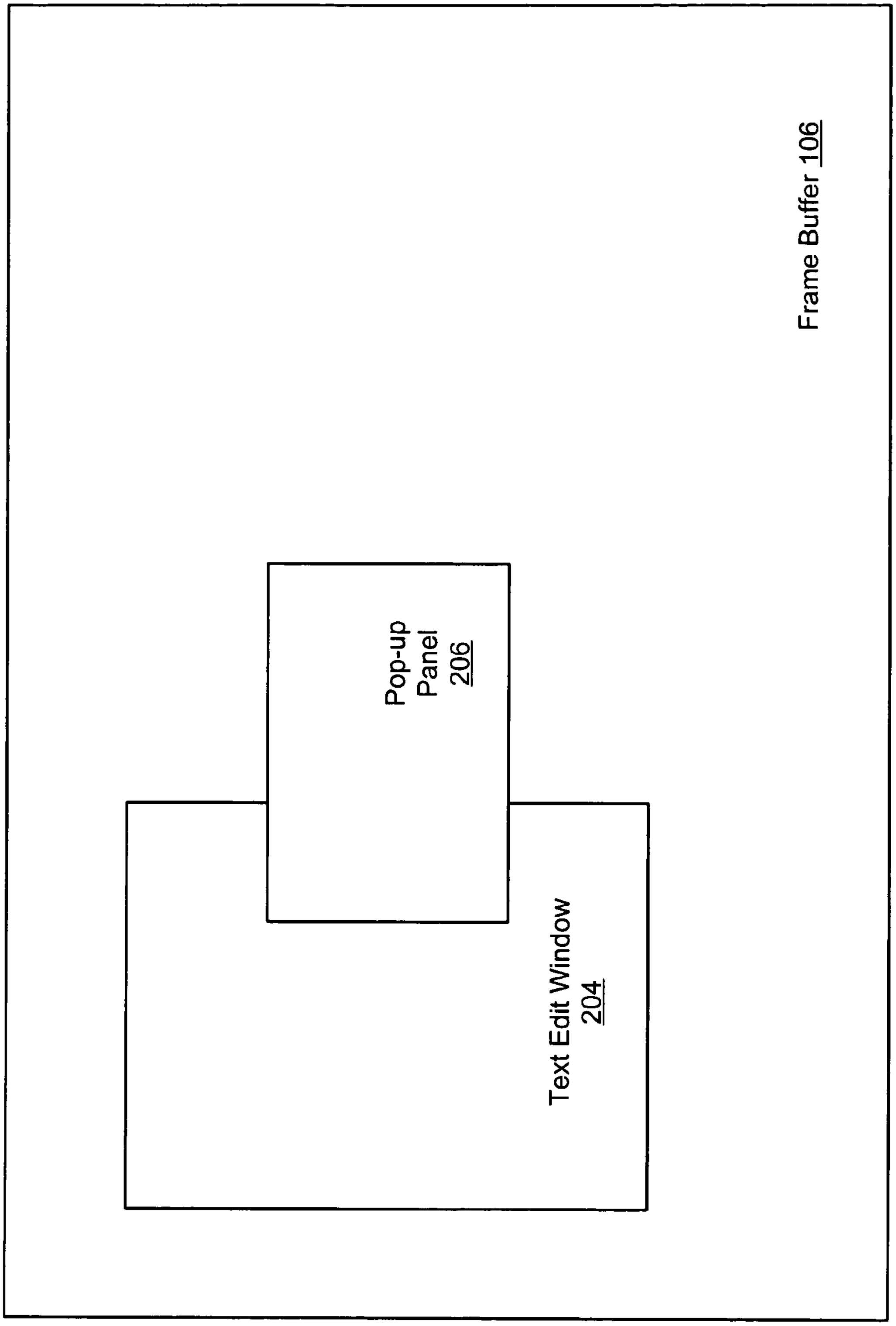
Fig. 2 (Prior Art)
FIG. 2 illustrates a frame buffer having multiple windows.
Figure 3:
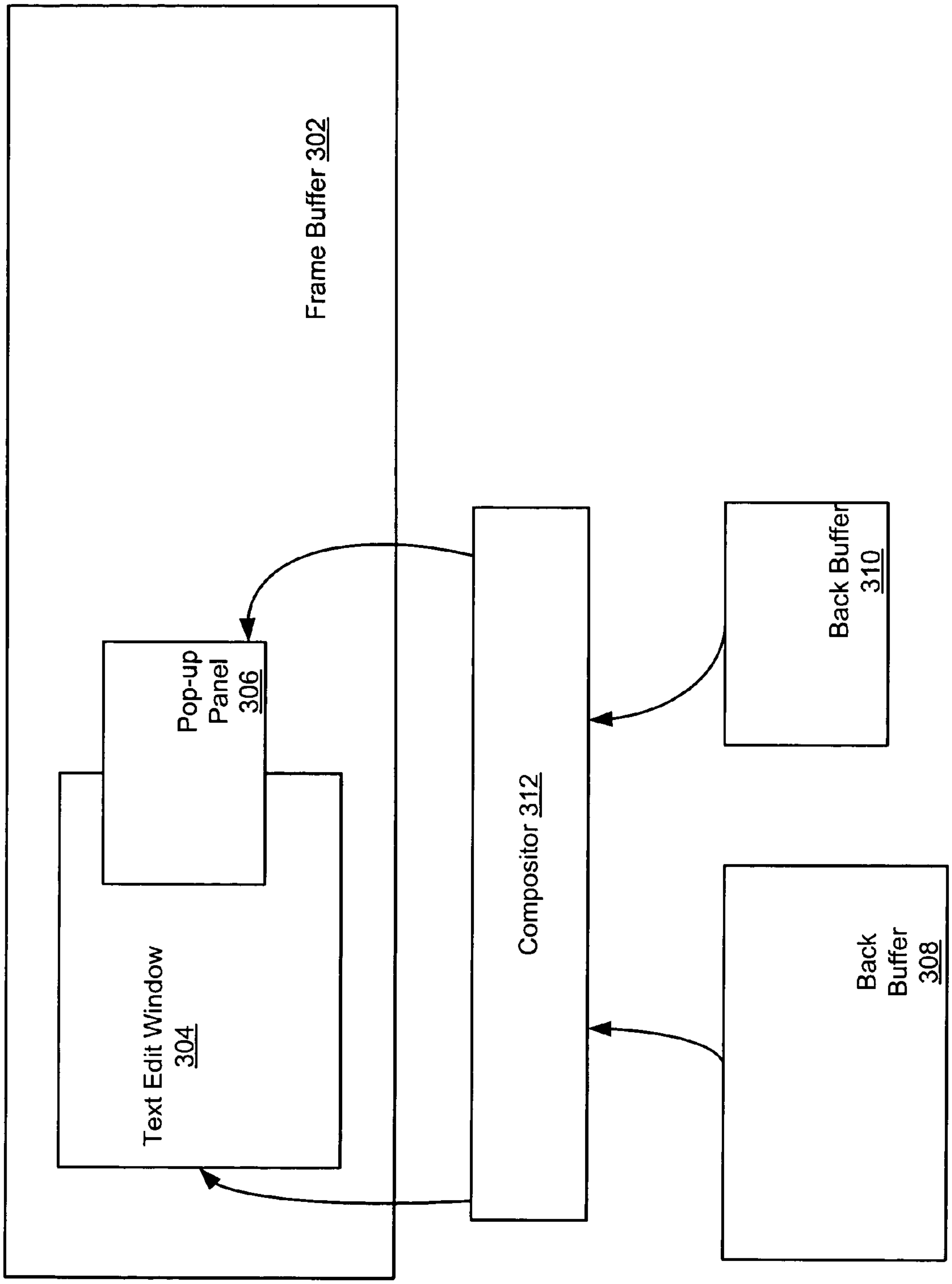
Fig. 3 (Prior Art)
FIG. 3 illustrates the use of a compositor in rendering windows.
Figure 4:
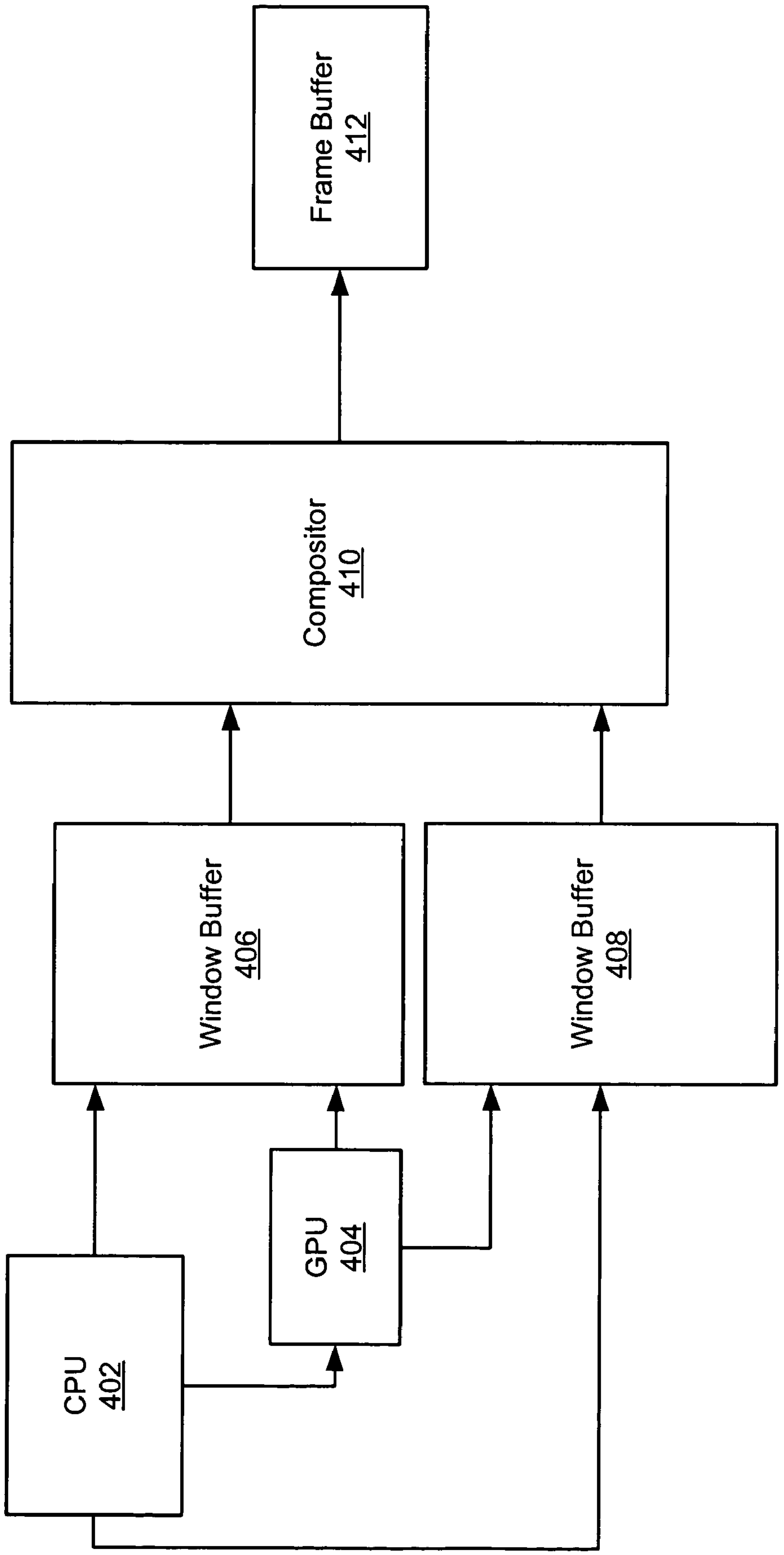
Fig. 4 (Prior Art)
FIG. 4 illustrates a conventional method for using a compositor
Figure 5:
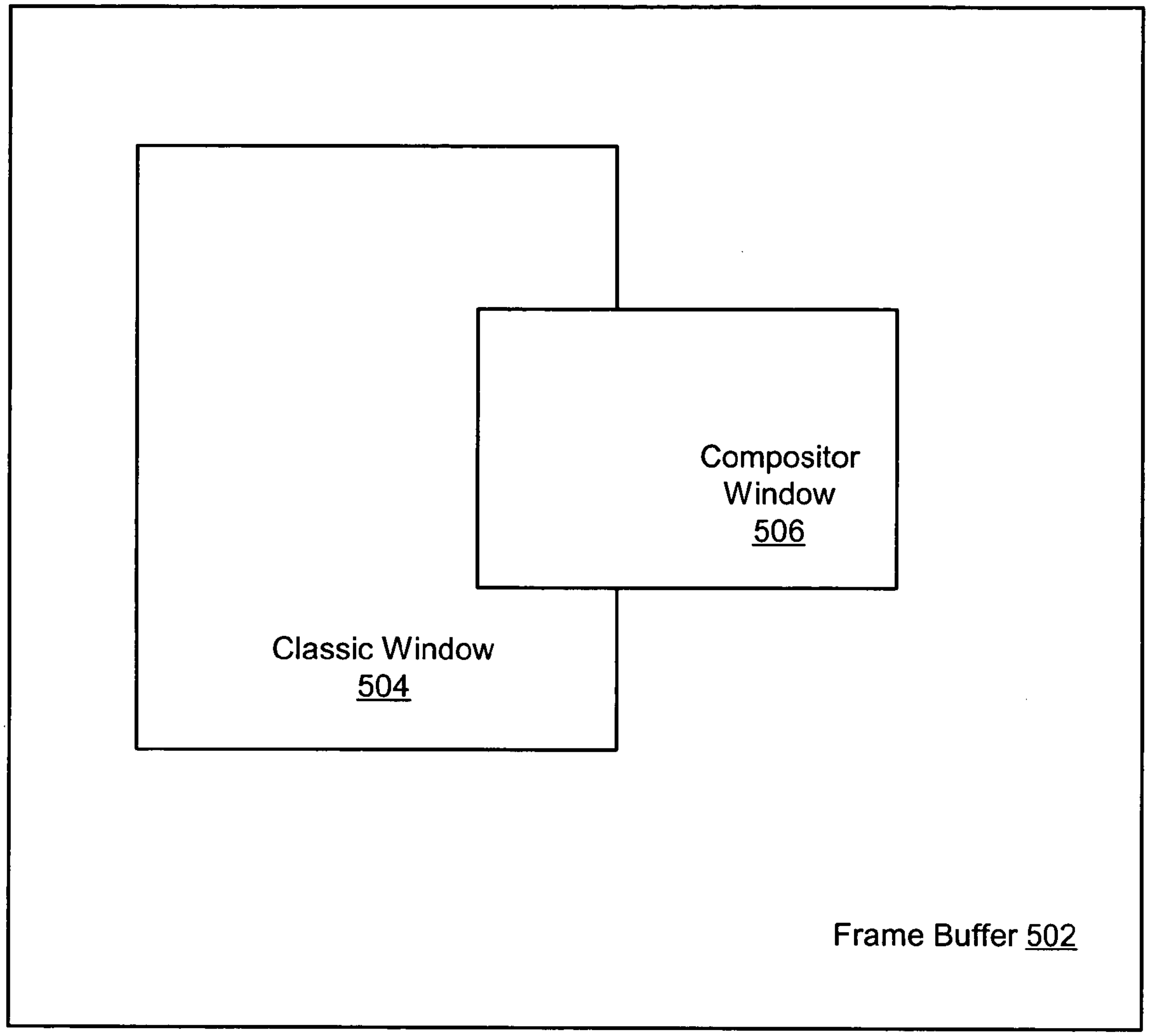
Fig. 5 (Prior Art)
FIG. 5 illustrates an example of a frame buffer that includes a classic window and a compositor window.
Figure 6:
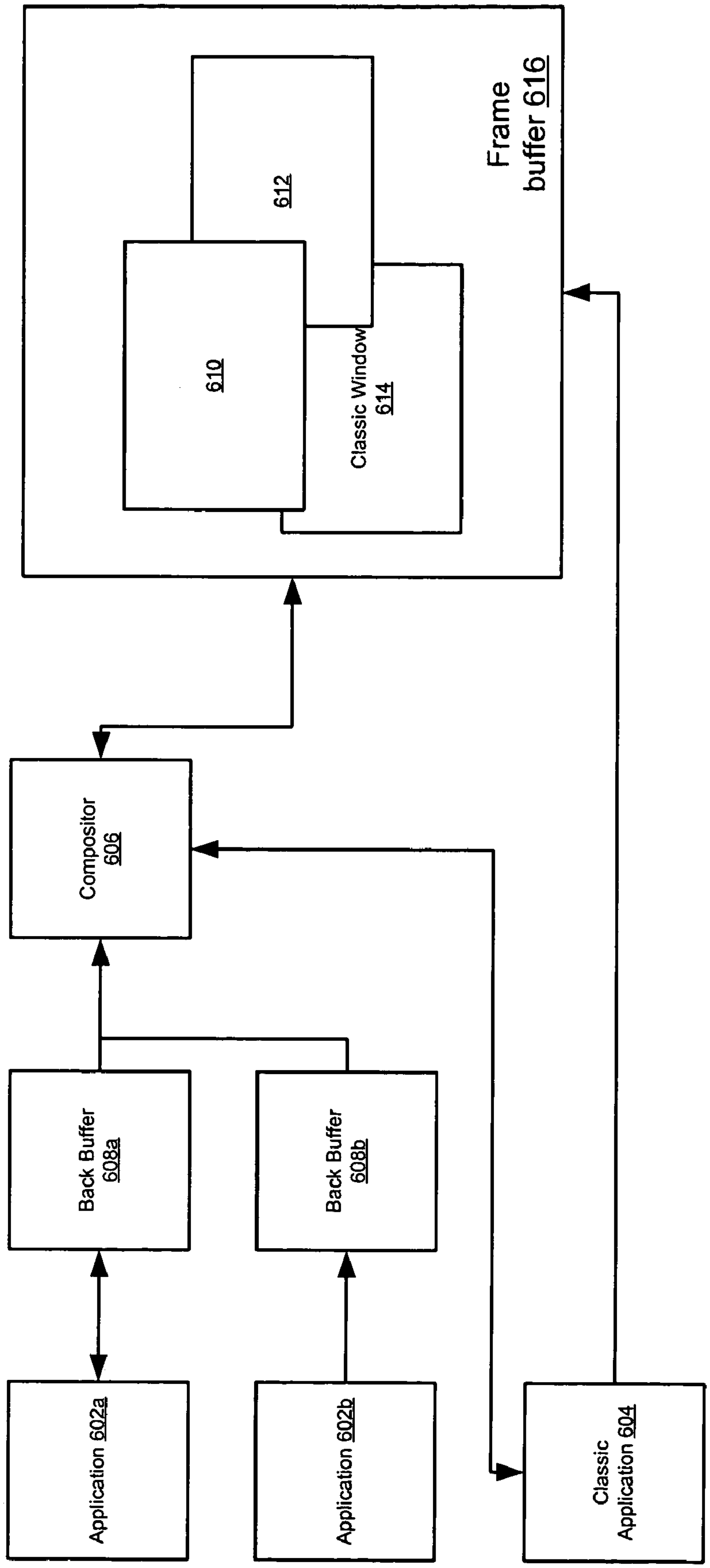
Fig. 6 (Prior Art)
FIG. 6 illustrates a conventional method for combining a compositor environment with a classic environment.
Figure 7:
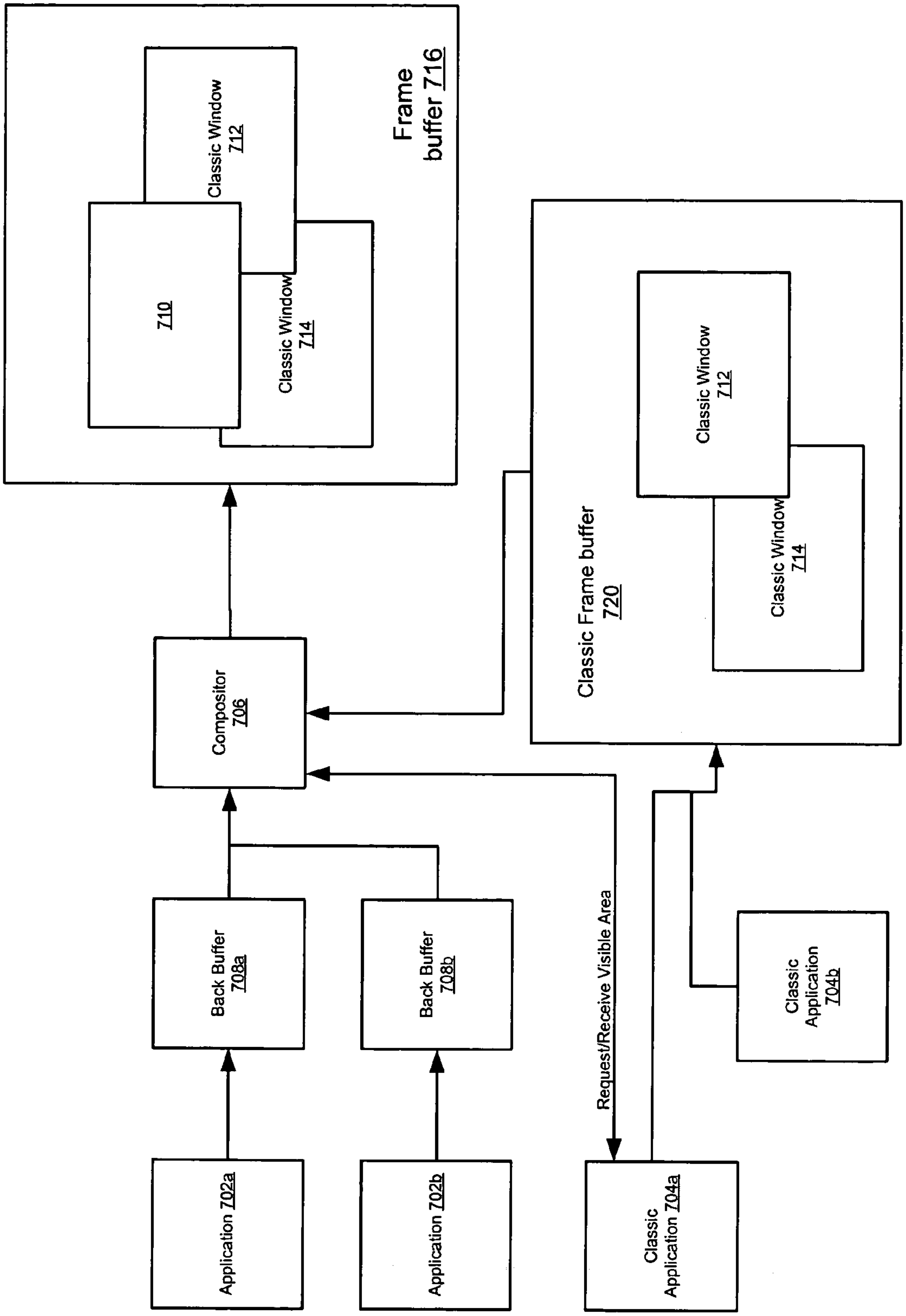
FIG. 7 illustrates an example block diagram in accordance with an embodiment of the present invention.

FIG. 7 illustrates an example block diagram in accordance with an embodiment of the present invention. FIG. 7 includes compositor applications 702, each having a back buffer 708; classic applications 704; compositor 706; classic frame buffer 720, shown with classic windows 712, 714; and frame buffer 716, shown with classic windows 712, 714 and composite window 710.

Classic applications 704 paint windows to classic frame buffer 720. Classic frame buffer 720 is, in a preferred embodiment, a software frame buffer in main memory, or in an alternative embodiment may be a hardware frame buffer in a video card. In either case, the frame buffer's address is supplied to any classic application that would normally expect to be supplied with the "real" frame buffer's address.

As before, applications 702 that are designed to use a compositor type system write their data to back buffers 708. The compositor 706 reads the contents of the back buffers 708 and paints the contents to the frame buffer 716, after determining the correct visible area of each window. Classic applications 704, however, now paint their windows to a classic frame buffer 720, instead of to the primary frame buffer. Classic applications still do not need any information about non-classic application windows in order to function properly. The compositor 706 returns the correct (in the classic applications' universe) visible region in response to a request from a classic application, and the classic application draws windows to classic frame 720 buffer in the way in which it is accustomed. Note that from the point of view of the classic application, it is writing to the "real" frame buffer, which is the only frame buffer the application is aware of. In reality, classic frame buffer 720 is returned instead of frame buffer 716 when the application is first provided with frame buffer information. The address of the frame buffer is normally provided as part of the graphics state created when an application starts up and initializes its drawing code, for example in the Macintosh environment with a call to the QDInit( ) function. Other programming environments make this information available on demand, as part of graphics state creation or window creation.

Compositor 706 preferably maintains a list of all windows that have been placed on the system's displays. The list is ordered in one embodiment from front to back, and in another embodiment from top to bottom, such that the relative window placement, i.e. which window is on top is known. When the geometry of a window changes, compositor 706 performs, for that window and all windows below that window, a three-step window geometry adjustment.

First, the areas of each window that will change from being visible to being obscured by other windows are determined, and the areas to be obscured are removed from the window's visible region so as to prevent them from being drawn. Second, the window whose geometry is being changed is updated to reflect the new geometry. Third, the areas of all windows that were formerly obscured, but which are now visible, are determined, and these revealed areas are redrawn into the primary frame buffer by either sending a repaint message to the application in the case of classic windows, or by having the compositor 706 assemble the appropriate areas of the display from the window back buffers 708.

In the present invention, a second set of window visibility data is added to each classic window. When the geometry of a classic window is changed, the three step window geometry adjustment described above is done twice by the compositor, first to update the actual window visibility information to be applied to the primary frame buffer, and second, to update the visibility of the windows considering only other classic windows, to be drawn to the classic frame buffer.

Compositor 706 paints windows to the frame buffer 716 by combining windows from buffers 708 with windows in classic frame buffer 720, and determining the appropriate visible window area for each window. Since compositor 706 is responsible for all of the painting, a classic window will not improperly be painted over another window, even when the application owning the window is using a shortcut to determine visible area. For example, as can be seen in classic frame buffer 720, classic window 712 partially covers classic window 714. Suppose that the classic application 704 that generated window 712 used a GetFrontWindow call to determine that window 712 was indeed the front window in its universe, and therefore simply painted 712 directly to frame buffer 720 instead of calling VisRegion from compositor 706. But, since the application 704 is painting only to the classic frame buffer 720, no harm comes from this optimization. Compositor 706 reads the contents of classic frame buffer 720 and paints it to frame buffer 716, and also paints window 710 in its proper position, overlapping both of the classic windows 712, 714.

Figure 8:
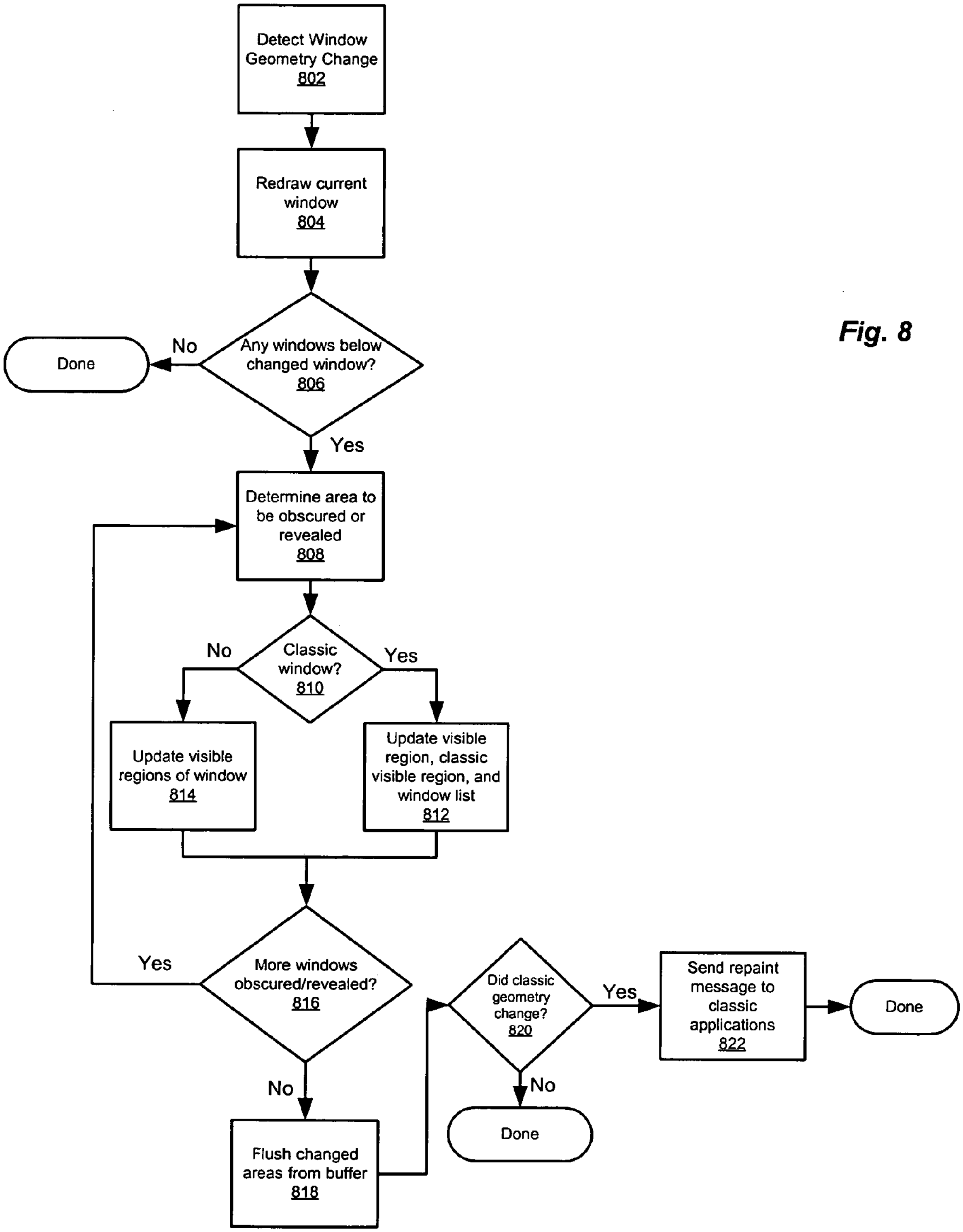
FIG. 8 illustrates a method for drawing windows in accordance with an embodiment of the present invention.

FIG. 8 illustrates a method for drawing windows in accordance with an embodiment of the present invention. When the compositor detects 802 a change in the geometry of a window, the current window is first redrawn 804. If no other windows are located below the redrawn window before or after the geometry change 806, the process stops. Otherwise, for a window located below the redrawn window, the area of that window to be obscured or revealed are determined 808. If that window is a classic window 810, the actual window visibility information to be applied to the primary frame buffer is updated 812, as well as the classic visible regions list and windows list. If the geometry in step 810 is not for a classic window, then just the actual visibility information to be applied to the primary fame buffer is updated 814. If there are more windows 816 that are being obscured or revealed, steps 808 to 814 are repeated for each of the windows. Next, in step 818, accumulated changed areas for all windows are flushed to the primary frame buffer by the compositor. If the geometry of a classic window changed 820, a repaint message is sent 822 to classic applications owning the changed windows, and the process terminates.

In a preferred embodiment, when classic applications 704 complete the repainting or redrawing of their revealed window areas, the compositor 706 is re-run for the portions of the primary frame buffer 716 in which the classic windows have refreshed their content. The compositor can preferably determine the area which has been repainted by the classic applications in one of two ways.

In one embodiment, the classic environment asks the compositor 706 to hide the mouse cursor within the areas it intends to repaint, by sending a ShieldCursor request. This request includes the area within which the window contents are to be redrawn, and where the cursor should not appear, so as to avoid a conflict between cursor and window content drawing operations. The compositor 706 collects the area in which the cursor has been shielded, and flushes this area to the frame buffer 716 periodically.

Alternatively, the classic environment, within which all classic applications 704 run, may observe application activity itself, including monitoring areas to be protected by ShieldCursor calls, and on determining that the applications 704 have completed drawing operations, may request that the accumulated area to which ShieldCursor calls and drawing primitives have been applied should be flushed to the frame buffer 716. Applications are determined to have completed drawing operations when they make well-known system calls to await more work to be done, such as "WaitNextEvent".

Accordingly, the present invention enables an operating system environment that fully supports both classic applications that implement window management themselves and paint windows directly to a frame buffer, as well as compositor applications that rely on a compositor to manage their visible areas.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the compositor and so forth may be provided in many or one module. Furthermore, for readability and ease in comprehension, the present invention has chiefly been described with respect to the rendering of application windows. Those of skill in the art will recognize however that the present invention has application more broadly to computer graphics rendering.

Some portions of the above description present the feature of the present invention in terms of algorithms and symbolic representations of operations on information. These algorithmic descriptions and representations are the means used by those skilled in the computer graphics display arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A system for rendering application windows, comprising:

a primary frame buffer for providing window data for output to a display device;

a classic application program configured to paint content of at least one window associated with the classic application program directly to a display frame buffer that provides output to a display device;

a classic frame buffer, configured to receive the painted content of the windows associated with the classic application program from the classic application program;

a compositor application program configured to paint content of at least one window associated with the compositor application program to a back buffer;

a plurality of back buffers, each back buffer configured to receive painted content of a window from a compositor application program;

a compositor configured to:

receive from the classic frame buffer the contents of the classic frame buffer, including geometry of each of the windows associated with the classic application program, and to determine a first visible region for each of the windows with respect to the other windows associated with the classic application program;

receive from each back buffer the painted content and geometry of the window stored in the back buffer;

determine for each of the windows associated with the classic application program and for each of the windows associated with the compositor application program a second visible region, the second visible region determined with respect to the geometry of each of the windows stored in the back buffer and the classic frame buffer; and to output to the primary frame buffer the second visible region for each of the windows associated with the classic application program and each of the windows associated with the compositor application program.

2. The system of claim 1 wherein the primary frame buffer forms part of a computer memory device.

3. The system of claim 1 wherein the primary frame buffer forms part of a graphics processing unit (GPU).

4. The system of claim 1 wherein the classic frame buffer forms part of a computer memory device.

5. The system of claim 1 wherein the classic frame buffer forms part of a graphics processing unit (GPU).

6. The system of claim 1 wherein the second visible region data includes a list of windows that are being displayed by the system.

7. The system of claim 6 wherein the list of windows is ordered from front to back.

8. The system of claim 6 wherein the list of windows is ordered from top to bottom.

9. A computer program product for rendering application windows, the computer program product comprising a computer-readable medium containing computer program code comprising:

a primary frame buffer module for providing window data for output to a display device;

a classic application program module configured to paint content of at least one window associated with the classic application program module directly to a display frame buffer that provides output to a display device;

a classic frame buffer module, configured to receive the painted content of the windows associated with the classic application program module from the classic application program module;

a compositor application program module configured to paint content of at least one window associated with the compositor application program module to a back buffer module;

a plurality of back buffer modules, each back buffer module configured to receive painted content of a window from a compositor application program module;

a compositor module configured to:

receive from the classic frame buffer module the contents of the classic frame buffer, including geometry of each of the windows associated with the classic application program, and to determine a first visible region for each of the windows with respect to the other windows associated with the classic application program module;

receive from each back buffer module the painted content and geometry of the window stored in the back buffer;

determine for each of the windows associated with the classic application program module and for each of the windows associated with the compositor application program module a second visible region, the second visible region determined with respect to the geometry of each of the windows stored in the back buffer and the classic frame buffer; and to output to the primary frame buffer the second visible region for each of the windows associated with the classic application program and each of the windows associated with the compositor application program.

10. The computer program product of claim 9 wherein the primary frame buffer module forms part of a computer memory device module.

11. The computer program product of claim 9 wherein the primary frame buffer module forms part of a graphics processing unit (GPU) module.

12. The computer program product of claim 9 wherein the classic frame buffer module forms part of a computer memory device module.

13. The computer program product of claim 9 wherein the classic frame buffer module forms part of a graphics processing unit (GPU) module.

14. A method for rendering application windows, comprising:

receiving classic application window content in a classic frame buffer, the classic application window content painted by at least one classic application program and including window geometry;

receiving compositor application window content in at least one back buffer, the compositor application window content painted by at least one compositor application program and including window geometry;

determining from the content of the classic frame buffer a first visible region for each of the classic application windows with respect to the other classic application windows;

determining from the content of the classic frame buffer and each of the back buffers a second visible region, the second visible region determined with respect to the geometry of each of the windows stored in the back buffer and the classic frame buffer; and outputting to the primary frame buffer the second visible region for each of the windows associated with the classic application program and each of the windows associated with the compositor application program.

15. The method of claim 14 wherein the primary frame buffer forms part of a computer memory device.

16. The method of claim 14 wherein the primary frame buffer forms part of a graphics processing unit (GPU).

17. The method of claim 14 wherein the classic frame buffer forms part of a computer memory device.

18. The method of claim 14 wherein the classic frame buffer forms part of a graphics processing unit (GPU).

19. The method of claim 14 further comprising:

responsive to receiving new compositor application window geometry in at least one of the back buffers:

updating the second visible region data in accordance with the new window geometry.

20. The method of claim 19 further comprising outputting to the primary frame buffer the updated second visible region data.

21. A compositor for rendering application windows, the compositor comprising:

a first receiving module for receiving contents of a classic frame buffer, including geometry of classic application program windows painted by at least one classic application program;

a first visible region determining module for determining a first visible region for each of the classic application program windows with respect to the other classic application program windows;

a second receiving module for receiving contents of at least one back buffer having window content painted by a compositor application program and including window geometry;

a second visible region determining module for determining for each of the classic application program windows and for each of the compositor application program windows a second visible region, the second visible region determined with respect to the geometry of each of the windows stored in the back buffer and the classic frame buffer; and an output module for outputting to a primary frame buffer the second visible region for each of the classic application program windows and each of the compositor application program windows.

* * * * *